United States Patent
Svardsjo

(10) Patent No.: US 8,891,257 B2
(45) Date of Patent: Nov. 18, 2014

(54) DRIVE CIRCUIT FOR A SYNCHRONOUS RECTIFIER AND A METHOD FOR CONTROLLING IT

(75) Inventor: Claes Svardsjo, Nacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 796 days.

(21) Appl. No.: 13/000,187

(22) PCT Filed: Jun. 23, 2008

(86) PCT No.: PCT/SE2008/050740
§ 371 (c)(1),
(2), (4) Date: Feb. 16, 2011

(87) PCT Pub. No.: WO2009/157819
PCT Pub. Date: Dec. 30, 2009

(65) Prior Publication Data
US 2011/0149616 A1    Jun. 23, 2011

(51) Int. Cl.
H02M 3/335 (2006.01)
H02M 1/38 (2007.01)
H02M 1/08 (2006.01)

(52) U.S. Cl.
CPC ............ *H02M 3/33592* (2013.01); *H02M 1/38* (2013.01); *H02M 1/08* (2013.01); *Y02B 70/1475* (2013.01)
USPC ...................................................... 363/21.06

(58) Field of Classification Search
USPC ......... 363/21.04, 21.06, 21.12, 21.14, 22, 23, 363/24, 25, 89, 126, 127
See application file for complete search history.

(56) References Cited

U.S. PATENT DOCUMENTS

| | | | |
|---|---|---|---|
| 5,907,481 A * | 5/1999 | Svardsjo | 363/25 |
| 6,111,769 A * | 8/2000 | Zhang et al. | 363/127 |
| 6,188,592 B1 * | 2/2001 | Farrington et al. | 363/98 |
| 7,102,898 B2 * | 9/2006 | Brkovic | 363/19 |
| 7,596,009 B2 * | 9/2009 | Matsumoto | 363/89 |

FOREIGN PATENT DOCUMENTS

| | | |
|---|---|---|
| EP | 1 261 122 A2 | 11/2002 |
| EP | 1261122 | 11/2002 |
| EP | 1 521 366 A2 | 4/2005 |
| WO | WO 99/23747 | 5/1999 |
| WO | WO 99/23747 A1 | 5/1999 |

OTHER PUBLICATIONS

International Search Report, PCT/SE2008/050740, Feb. 12, 2009.

* cited by examiner

*Primary Examiner* — Adolf Berhane
*Assistant Examiner* — Jeffrey Gblende
(74) *Attorney, Agent, or Firm* — Roger S. Burleigh

(57) ABSTRACT

A pulsed drive signal without a dead band can be achieved by a drive circuit arranged to receive opposite pulsed input signals, having a dead band between them, a transformer arranged to receive the input signals and output intermediary signals, time delay circuitry arranged to receive the intermediary signals, and to provide buffer input signals, corresponding to the intermediary signals, but with a ramped up transition from a low to a high signal, a first and a second buffer stage arranged to receive the first and second buffer input signals, respectively, and produce the first and the second drive output signal corresponding to the first and second pulsed input signal but with the transition from a high to a low signal delayed to reduce the dead band.

11 Claims, 2 Drawing Sheets dead band between PWM drive A and B dead band covered by gate signal stretch

DRIVE CIRCUIT FOR A SYNCHRONOUS RECTIFIER AND A METHOD FOR CONTROLLING IT

CROSS REFERENCE TO RELATED APPLICATION

This application is a 35 U.S.C. §371 national stage application of PCT International Application No. PCT/SE2008/050740, filed on 23 Jun. 2008, the disclosure and content of which is incorporated by reference herein in its entirety. The above-referenced PCT International Application was published in the English language as International Publication No. WO 2009/157819 A1 on 30 Dec. 2009.

TECHNICAL FIELD

The present invention relates to a drive circuit and a method of providing a drive output signal.

BACKGROUND AND RELATED ART

In systems with large board power requirements, a distributed power architecture, using an intermediate bus voltage, tend to become more and more used. The reason behind this approach is the increasing demand for fast load step response in the down-stream DC/DC converters, normally defined as Point-Of-Load, POL converters. In order to obtain a fast load step response, the POL converter is based on a non-isolated structure. Therefore, the Intermediate Bus Converter, IBC, provides isolation between the voltage distribution and the intermediate bus voltage, which is held at a level, appropriate as input voltage for the POL converter. Thus, a key feature for the IBC is conversion efficiency.

Since conversion efficiency of the IBC is a key feature, MOSFETs are used to rectify the transformer's secondary voltage. This method is normally referred to as synchronous rectification. Such a device significantly reduces conduction losses compared to Schottky diodes. The most utilized rectifying method is the "self-driven" structure, where the voltage across the transformers secondary is used as a gate-drive for the synchronous rectifiers. This method is well recognized and described in any power conversion literature.

Unregulated intermediate bus converters (defined as "fixed ratio IBC") are running with a duty cycle very close to 50% for each half cycle. In order to prevent failure or malfunction, there is a small functional dead-band between the primary switches, which will lead to power losses. Some prior art solutions propose ways of reducing the dead band.

US 2005/0184716 A1 discloses an apparatus for minimizing the power losses associated with the dead time between the on-time of to series connected switches of a power converter. A control arrangement is provided to change the duration of the dead time in order to minimize the power loss.

U.S. Pat. No. 7,184,281 B2 discloses a power converter having a control circuit for minimizing the dead time to reduce the energy loss caused by alternating between the two switches.

However, as mentioned above, the dead band serves the function of preventing failure or malfunction of the circuit. Therefore, the dead band cannot be avoided altogether, without risking failure or malfunction.

SUMMARY OF THE INVENTION

It is an object of the invention to improve the efficiency of a power supply circuit.

One aspect of the invention relates to a drive circuit arranged to receive a first and a second pulsed input signal, said input signals being opposite each other and with a dead band between them, and to provide a first and a second drive output signal.

The drive circuit comprises:
- a transformer having a primary winding arranged to receive the input signals and a secondary winding arranged to output a first and a second intermediary signal corresponding to the inverted input signals,
- time delay circuitry arranged to receive the first and second intermediary signals from the secondary winding, said time delay circuitry being arranged to provide a first and a second buffer input signal, corresponding to the first and second intermediary signal, but with a ramped up transition from low to high signal,
- a first and a second buffer stage having a first and a second signal output, respectively.

The buffer stages are arranged to receive the first and second buffer input signals, respectively and produce the first and the second drive output signal corresponding to the first and second pulsed input signal but with the transition from high to low signal delayed to reduce or eliminate the dead band.

This drive circuit can be used to provide gate drive signals to the synchronous rectifiers of a power supply circuit such as a half bridge or full bridge device, or a push-pull device. The drive circuit is arranged to provide gate drive signals with no dead time between them.

The invention also relates to a method of providing a pulsed drive output signal by means of a drive circuit comprising a transformer having a primary winding arranged to receive a first and a second input signal and a secondary winding arranged to output a first and a second intermediary signal.

The method comprises the steps of
- providing alternatingly a high voltage pulse and a low voltage pulse as the first and second input signal to the primary winding with a dead-band after each pulse,
- applying a time delay to the first and second intermediary signals from the secondary winding, to produce a first and a second buffer input signal, corresponding to the first and second intermediary signal, but with a ramped up transition from low to high signal,
- manipulating the first and second buffer input signals in a first and second buffer stage, to produce the first and the second drive output signal corresponding to the first and second pulsed input signal but with the transition from high to low signal delayed to reduce or eliminate the dead band.

As explained above, there must be a dead time between the drive pulses PWM drive A and PWM drive B. During this time, gate-drive to the synchronous switches is cancelled and the output current is conducted via the MOSFET's intrinsic body-drain diode. Due to both high rate of voltage drop and reverse recovery charge in the intrinsic body-drain diode, the synchronous rectifier becomes very inefficient during this time. Even if the dead-band occupies only a small portion of total conduction time, the body-drain conduction during this period has a destructive effect on the overall conversion efficiency.

The basic concept of the invention is to provide the gate drive of the synchronous rectifier with a prolonged conduction-time equal to the dead-band. In this way, body-drain conduction of the synchronous rectifiers is prevented during the dead-band time. Since the voltage drop of the intrinsic body-diode is high and the dead-band presents sufficient time for the body-diode reverse recovery charge, significant power dissipation occurs during this period in the prior art. This power dissipation is avoided by the invention since the current will flow between the drain and the source instead of through the body-diodes of the rectifiers, providing a connection having significantly lower impedance.

A "fixed ratio" (un-regulated) IBC can be regarded as a buck-derived topology. Even if the primary switches is running close to 50%, there is a dead-band between the conduction periods of the primary switches. The dead band is small but must be present to ensure function safety. During this period, the output inductor current is carried through the intrinsic body-diode of the MOSFET if they are arranged as self-driven synchronous rectifiers.

Time delay circuitry preferably comprises a delay resistance and a diode connected in parallel, the diode being connected with its forward direction towards the transformer.

Each of the first and second buffer stages preferably comprises a first p channel type transistor and a second n channel type transistor. The sources of the first transistors of the buffer stages are connected to a first voltage and the sources of the second transistors of the buffer stages are connected to a second voltage, typically to ground. The drains of the first and second transistors of each buffer stage are interconnected. The interconnected drains of the transistors of the first buffer stage form the first signal output, and the interconnected drains of the transistors of the second buffer stage form the second drive output signal.

An aspect of the invention also relates to a power supply circuit comprising a power transformer having a primary and a secondary winding, a first and a second primary switch connected to the primary winding and a first and a second synchronous rectifier connected to the secondary winding, said power supply circuit being characterized in that it comprises a drive circuit as described above, the first and second output of the drive circuit being arranged to provide a gate drive signal to the first and the second synchronous rectifier, respectively.

BRIEF DESCRIPTION OF THE DRAWINGS

The invention will be described in more detail in the following, by way of example and with reference to the appended drawings in which:

FIG. 1b shows a circuit for providing gate drive signals to the synchronous rectifiers in the power supply circuit of FIG. 1a.

DETAILED DESCRIPTION OF EMBODIMENTS

Figure 1A:
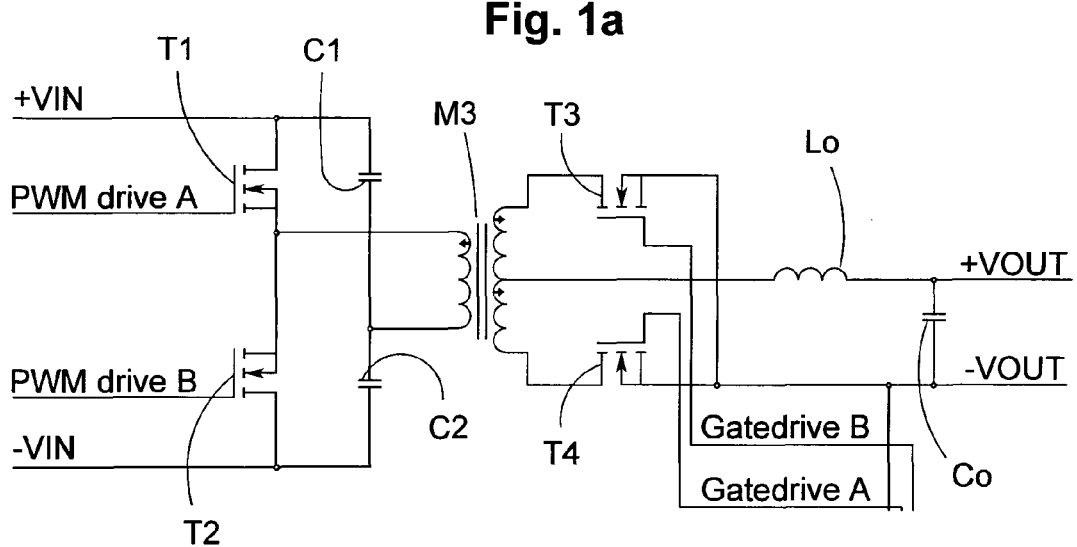
FIG. 1a illustrates a power supply circuit comprising two synchronous rectifiers

FIG. 1a shows a conventional half bridge circuit, as an example of a circuit to which the inventive principles can be applied. Other types of circuits, such as full bridge circuits and push-pull circuits could also be controlled according to the inventive principle. Such circuits are not shown in this document as they are known to the skilled person. The circuit is powered by an input voltage (not shown). The shape and timing of the pulses at different points in the circuit will be discussed in connection with FIG. 2 below.

A first power transformer M3 of the half bridge circuit comprises a primary winding and a secondary winding. A first end of the primary winding is connected to the source of a first MOSFET T1. The drain of the first MOSFET T1 is connected to a positive input voltage +Vin, The first end of the primary winding is also connected to the drain of a second MOSFET T2, the source of which is connected to a negative input voltage −Vin. The second end of the primary winding is connected to the positive input voltage +Vin through a first capacitor C1 and to the negative input voltage −Vin through a second capacitor C2. A control unit is arranged to provide a first drive pulse PWM drive A to the gate of the first MOSFET T1 and a second drive pulse PWM drive B to the gate of the second MOSFET T2. The first and second MOSFET T1, T2 alternatingly connect the input voltage +VIN and −VIN respectively, to the primary winding of the first power transformer M3, in a manner controlled by the control circuit by means of the first and second drive pulses. In order to prevent malfunction, there is a dead band between the drive pulses.

To a first end of the secondary winding the drain of a third MOSFET T3 is connected. To a second end of the secondary winding the drain of a fourth MOSFET T4 is connected. The sources of the third and the fourth MOSFET are interconnected and provide a negative output voltage SecGND is obtained. A centre tap of the secondary winding is connected to a first end of an output inductor Lo, the second end of the output inductor Lo providing a positive output voltage +Vout. Between the positive +Vout and the negative −Vout output voltages a capacitor Co is connected. In the prior art, the gate of the third MOSFET T3 is connected to the drain of the fourth MOSFET T4 and the gate of the fourth MOSFET T4 is connected to the drain of the third MOSFET T3.

The first and second transistors act as primary switches and the third and fourth transistors act as synchronous rectifiers. As explained above, a small functional dead-band is used between the primary switches T1, T2 to prevent failure or malfunction. During this time, gate-drive to the synchronous switches T3, T4 is cancelled and the output current is conducted via the intrinsic body-drain diode of the respective MOSFET T3, T4.

According to the invention this problem is solved by applying modified gate drive pulses to the synchronous rectifiers, which will prevent body-drain conduction of the synchronous rectifiers during the dead-band time. In short, the gate drive pulses for the synchronous rectifiers should be prolonged to extend through the dead band time.

Figure 1B:
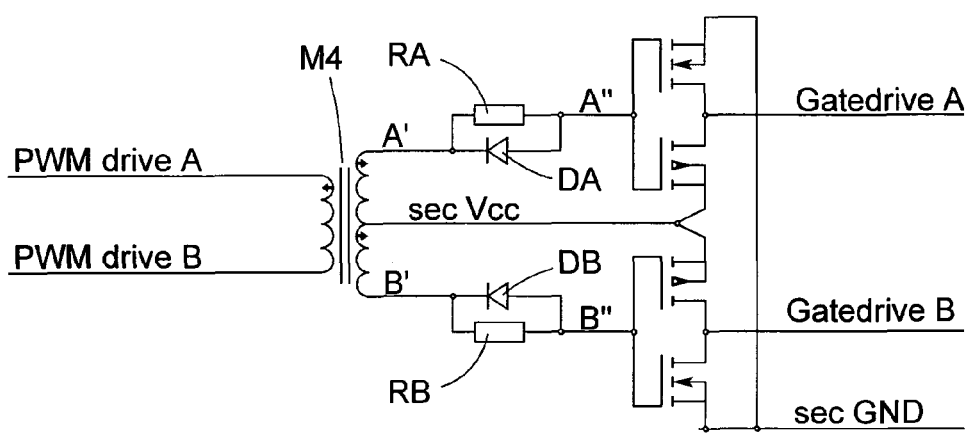

FIG. 1b shows a gate drive circuit arranged to provide a first and a second gate drive signal, Gate drive A and Gate drive B, respectively, to be applied to the gates of the synchronous rectifiers T3, T4 of FIG. 1a. The gate drive circuit comprises a volt/second transfer signal transformer M4 having a first winding and a second winding. The drive signals PWM drive A and PWM drive B, that are applied to the primary switches T1, T2 of FIG. 1a, are also applied to the primary winding of the gate drive circuit.

A first buffer stage and a second buffer stage are connected at the first and second end, respectively of the secondary winding. Each buffer stage comprises a first and a second MOSFET, the drains of which are interconnected. The first and second MOSFET are complementary, that is, one is of n channel type and the other of p channel type. The sources of the p channel type MOSFET from each buffer stage are interconnected and connected to the voltage SecVec. The sources of the n channel type MOSFETs are connected to ground SecGND. The interconnected drains of the MOSFETs in the first buffer stage provide the drive signal Gate drive A to the fourth MOSFET T4 of FIG. 1a, and the interconnected drains of the MOSFETs in the second buffer stage provide the drive signal Gate drive B to the third MOSFET T3 of FIG. 1a.

Between the secondary winding and the gates of the respective buffer stage, a delay circuit is arranged, comprising a resistor RA, RB, respectively. Each resistor RA, RB is connected to the gates of the complementary MOSFETs of the buffer stage that it belongs to and makes up a low-pass filter together with the input capacitance of the respective gates. A diode DA, DB is connected in parallel with each resistor R and is directed so that it will allow the leading edge of a pulse A', B' provided to the delay circuit to ramp up. The resulting pulse A", B" from each delay circuit is fed to the buffer stage. The centre tap of the secondary winding, which has the voltage SecVcc applied to it, is connected between drains of the buffer stages. The resulting output pulses from the buffer stages will vary between the voltage secVcc and secGND for each of the buffer stages.

Figure 2:
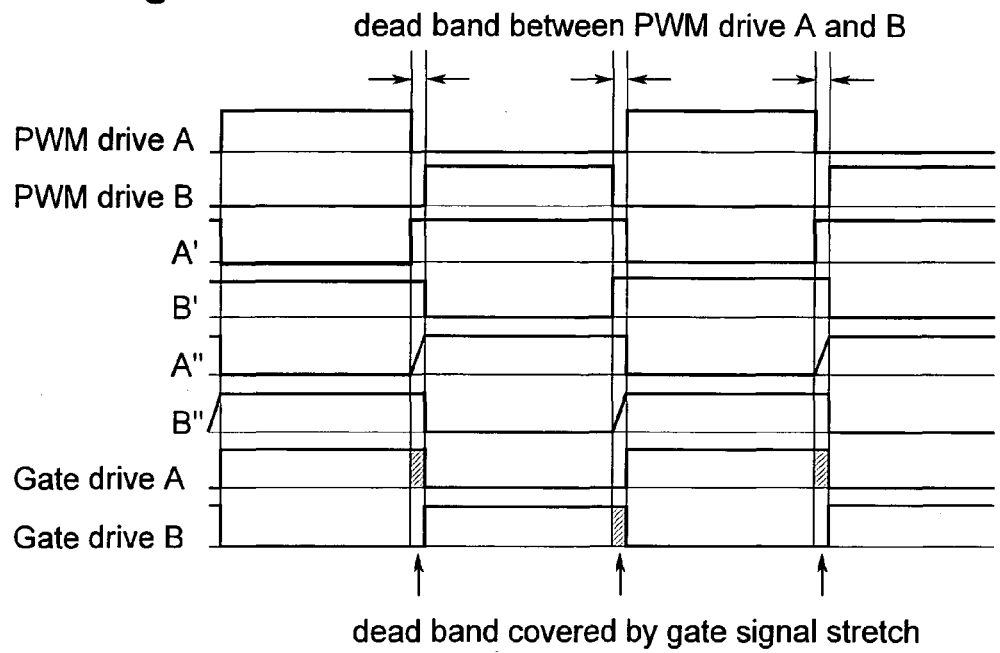
FIG. 2 is a timing diagram of the input, output an intermediate pulses in the power supply circuit

The working principle is as follows, with reference to FIG. 2:

Control pulses, "PWM drive A" and "PWM drive B", are fed to the primary winding of a signal transformer M4. These are the same control pulses PWM drive A and PWM drive B that are applied to the primary switches T1, T2 of FIG. 1a. As can be seen, there is a delay, called the dead band, between the end of the "PWM drive A" pulse and the start of the "PWM drive B" pulse.

On the secondary winding of the signal transformer M4, the control pulse appears inverted since the center-tap is referenced to the positive branch of a secondary gate drive voltage "secVcc". These pulses are defined in the timing diagram as A' and B', respectively.

The pulses A' and B' are fed via the delay resistors RA, RB, respectively to the input of the two buffer stages. The resistor RA, RB together with the input capacitance of the MOSFET makes up a low-pass filter. The direction of the diode, paralleled with the delay resistor, allows the leading edge of the A' and B' pulse to ramp up as can be seen in the timing diagram. These pulses having a ramped up leading edge are denoted in the below timing diagram as A" and B".

The rate of ramp-up determines when the inverting MOSFET buffer will change from "high" to "low", and with a proper value of the delay resistors RA, RB, the dead-band between the "PWM drive" pulses will be covered.

The resulting pulses "Gate drive A" and "Gate drive B" have the same timing as the input pulses "PWM drive A" and "PWM drive B" to the transformer M4, but with the addition of conduction time just covering the dead-band.

Figure 3:
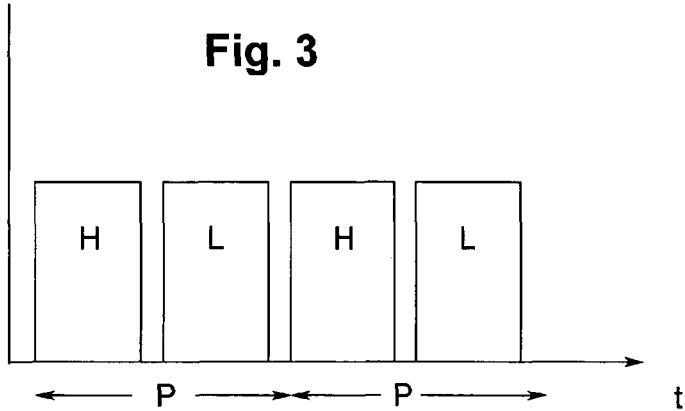
FIG. 3 illustrates the timing of the input pulses to the power supply.

FIG. 3 illustrates the timing of the drive pulses PWM drive A and PWM drive B. In one period first a high pulse, denoted H, is applied and then a low pulse, denoted L. Between the high pulse and the low pulse there is a pause, called a dead band, for the reasons discussed above.

In the prior art, while the high and low pulses are applied, currents will flow in the circuit and through the MOSFETs. During the dead-bands, there will be no control voltage applied to the gates of the MOSFETs. Therefore, in the prior art, no current can flow through the MOSFETs, but will instead flow through the intrinsic body-drain diodes of the MOSFETs. According to the invention this diode current is prevented by applying a control voltage on the gates of the MOSFETs during the deadbands to allow the current to flow through the MOSFETs also during these periods.

The invention claimed is:

1. A drive circuit configured to receive a first and a second pulsed input signal, the first and second input signals being opposite each other and with a dead band between them, and to provide a first and a second drive output signal, the drive circuit comprising:

a transformer having a primary winding configured to receive the first and second pulsed input signals and a secondary winding configured to output a first and a second intermediary signal corresponding to the first and second pulsed input signals;

time delay circuitry configured to receive the first and second intermediary signals from the secondary winding, the time delay circuitry being configured to provide a first and a second buffer input signal, corresponding to the first and second intermediary signal, but with a ramped up transition from a low to a high signal; and a first and a second buffer stage having a first and a second signal output, respectively, the first and second buffer stages being configured to receive the first and second buffer input signals, respectively, and produce the first and the second drive output signals corresponding to the first and second pulsed input signals, wherein:

an initiation of the first and second pulsed input signals is configured to produce an initiation of the first and second drive output signals, respectively, with substantially a same timing; and a termination of the first and second pulsed input signals is configured to produce a termination of the first and second drive output signals, respectively, with a delay.

2. The drive circuit according to claim 1, wherein the time delay circuitry comprises a delay resistance and a diode connected in parallel, the diode being connected with a forward direction towards the transformer.

3. The drive circuit according to claim 1, wherein each of the first and second buffer stages comprises:

a first p channel type transistor; and a second n channel type transistor, wherein sources of the first p channel type transistors of the buffer stages are connected to a first voltage and sources of the second n channel type transistors of the buffer stages are connected to a second voltage, and drains of the first p channel type and second n channel type transistors are interconnected to form the first and second signal output, to provide the first and second drive output signal, respectively.

4. The drive circuit according to claim 1, wherein the primary winding has a same polarity as the secondary winding.

5. A method of providing a first and a second drive output signal from a drive circuit comprising a transformer having a primary winding configured to receive a first and a second pulsed input signal and a secondary winding configured to output a first and a second intermediary signal, the method comprising the steps of:

providing alternatingly a high voltage pulse and a low voltage pulse as the first and second pulsed input signals to the primary winding with a dead-band after each of the first and second pulsed input signals;

applying a time delay to the first and second intermediary signals from the secondary winding, to produce a first and a second buffer input signal, corresponding to the first and second intermediary signals but with a ramped up transition from a low to a high signal; and manipulating the first and second buffer input signals in a first and second buffer stage, to produce the first and the second drive output signals corresponding to the first and second pulsed input signals, wherein:

initiating the first and second pulsed input signals initiates the first and second drive output signals, respectively, with substantially a same timing; and terminating the first and second pulsed input signals terminates the first and second drive output signals, respectively, with a delay.

6. The method according to claim 5, further comprising the step of providing the first and second drive output signals as control signals to a first and a second synchronous rectifier arranged on a secondary side of a power transformer of a power supply circuit.

7. The method according to claim 5, wherein
the primary winding has a same polarity as the secondary winding.

8. A method of providing a first and a second drive output signal, comprising:
receiving first and second pulsed input signals that are opposite to each other and with a dead band between them;
providing a transformer having a primary winding configured to receive the first and second pulsed input signals and a secondary winding configured to output a first and a second intermediary signal corresponding to first and second pulsed input signals;
providing time delay circuitry configured to receive the first and second intermediary signals from the secondary winding, wherein the time delay circuitry is configured to provide a first and a second buffer input signal, corresponding to the first and second intermediary signal, but with a ramped up transition from a low to a high signal; and
providing a first and a second buffer stage having a first and a second signal output, respectively, the first and second buffer stages are configured to receive the first and second buffer input signals, respectively, and produce the first and the second drive output signals corresponding to the first and second pulsed input signals, wherein:
an initiation of the first and second pulsed input signals is configured to produce an initiation of the first and second drive output signals, respectively, with substantially a same timing; and
a termination of the first and second pulsed input signals is configured to produce a termination of the first and second drive output signals, respectively, with a delay.

9. The method according to claim 8, wherein the time delay circuitry comprises a delay resistance and a diode connected in parallel, the diode being connected with a forward direction towards the transformer.

10. The method according to claim 8, wherein each of the first and second buffer stages comprises:
a first p channel type transistor; and
a second n channel type transistor, wherein sources of the first p channel type transistors of the buffer stages are connected to a first voltage and sources of the second n channel type transistors of the buffer stages are connected to a second voltage, and drains of the first p channel type and second n channel type transistors are interconnected to form the first and second signal output, to provide the first and second drive output signal, respectively.

11. The method according to claim 8, wherein the primary winding has a same polarity as the secondary winding.

* * * * *